United States Patent
Yu et al.

(10) Patent No.: US 12,466,705 B2
(45) Date of Patent: Nov. 11, 2025

(54) BRAKE DEVICE FOR WINCH AND WINCH

(71) Applicant: T-MAX (HANGZHOU) TECHNOLOGY CO., LTD., Zhejiang (CN)

(72) Inventors: Hangfei Yu, Zhejiang (CN); Shipei Yao, Zhejiang (CN); Senbiao Ge, Zhejiang (CN); Haojia Chen, Zhejiang (CN); Haibin Chen, Zhejiang (CN); Xuebo Hu, Zhejiang (CN)

(73) Assignee: T-MAX (HANGZHOU) TECHNOLOGY CO., LTD., Hangzhou (CN)

( * ) Notice: Subject to any disclaimer, the term of this patent is extended or adjusted under 35 U.S.C. 154(b) by 287 days.

(21) Appl. No.: 18/189,575

(22) Filed: Mar. 24, 2023

(65) Prior Publication Data

US 2023/0322534 A1    Oct. 12, 2023

(30) Foreign Application Priority Data

Apr. 11, 2022    (CN) .......................... 202220829268.6

(51) Int. Cl.
*B66D 5/06* (2006.01)

(52) U.S. Cl.
CPC ...................................... *B66D 5/06* (2013.01)

(58) Field of Classification Search
CPC ............ B66D 5/06; B66D 5/20; F16D 41/206
See application file for complete search history.

(56) References Cited

U.S. PATENT DOCUMENTS

| | | | |
|---|---|---|---|
| 4,651,854 A * | 3/1987 | Harada | F16D 41/206 192/223.4 |
| 11,970,377 B2 * | 4/2024 | Yu | B66D 5/06 |
| 2014/0027232 A1 * | 1/2014 | Lin | F16D 41/064 192/15 |
| 2015/0167816 A1 * | 6/2015 | Li | F16D 3/12 474/166 |
| 2017/0015536 A1 * | 1/2017 | Irie | B66D 5/12 |

FOREIGN PATENT DOCUMENTS

WO    WO-2020001692 A1 *    1/2020    ........... F16D 41/206

\* cited by examiner

*Primary Examiner* — Anna M Momper
*Assistant Examiner* — Nathaniel L Adams
(74) *Attorney, Agent, or Firm* — David D. Brush; Westman, Champlin & Koehler, P.A.

(57) ABSTRACT

A brake device for a winch and a winch are provided. The winch includes a rope drum, and the brake device includes a brake sleeve, an elastic ring, a torsion spring and a braking assembly. The torsion spring is fitted over the braking assembly, and the brake sleeve is fitted over the torsion spring. The braking assembly is configured to drive the torsion spring to move between an extended position and a retracted position, so as to lock and release the brake sleeve. The elastic ring is fitted over the brake sleeve and configured to abut with an inner wall of the rope drum.

15 Claims, 2 Drawing Sheets

BRAKE DEVICE FOR WINCH AND WINCH

CROSS-REFERENCE TO RELATED APPLICATION

This application is based on and claims priority to the Chinese Patent Application No. 202220829268.6 filed on Apr. 11, 2022, the entire contents of which are incorporated herein by reference.

TECHNICAL FIELD

The present disclosure relates to a field of winches, and more particularly, to a brake device for a winch and a winch.

BACKGROUND

In a control system of a winch, a brake part is a very important component. In order to ensure the safe operation of the winch during the process of removing obstacles, mounting facilities and dragging objects, it is necessary to accurately control the brake of the winch, so as to improve the safety and stability of the winch in use. However, when the winch in the related art brakes, the noise is large, the energy consumption is high, and the use experience of a user is poor.

SUMMARY

Embodiments of a first aspect of the present disclosure provide a brake device for a winch, the winch includes a rope drum, and the brake device includes a brake sleeve, an elastic ring, a torsion spring and a braking assembly. The torsion spring is fitted over the braking assembly, and the brake sleeve is fitted over the torsion spring. The braking assembly is configured to drive the torsion spring to move between an extended position and a retracted position, so as to lock and release the brake sleeve. The elastic ring is fitted over the brake sleeve and configured to abut with an inner wall of the rope drum.

Embodiments of a second aspect of the present disclosure provide a winch, and the winch includes: a rope drum configured to wind a traction rope on an outer periphery of the rope drum; and a brake device arranged in the rope drum. The brake device includes a brake sleeve, an elastic ring, a torsion spring and a braking assembly. The torsion spring is fitted over the braking assembly, and the brake sleeve is fitted over the torsion spring. The braking assembly is configured to drive the torsion spring to move between an extended position and a retracted position, so as to lock and release the brake sleeve. The elastic ring is fitted over the brake sleeve and abuts with an inner wall of the rope drum.

DETAILED DESCRIPTION

Figure 1:
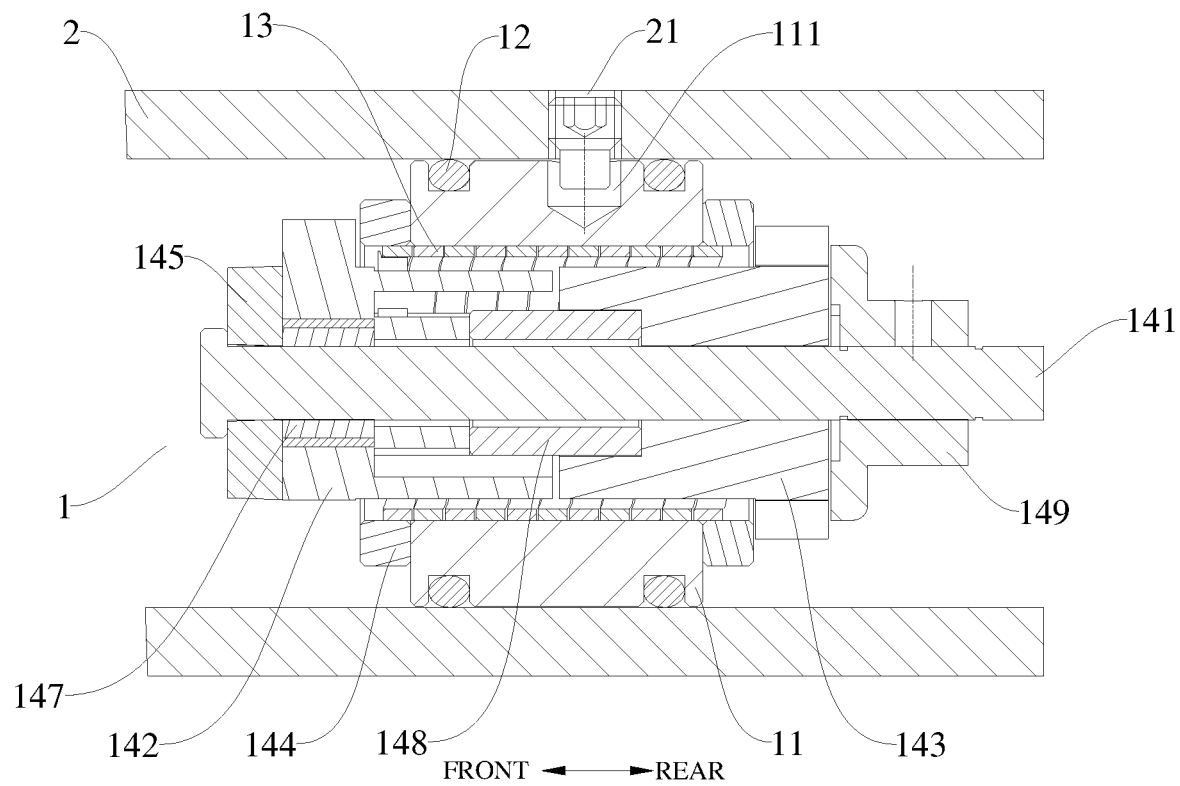
FIG. 1 is a partial sectional view of a winch according to an embodiment of the present disclosure.

Embodiments of the present disclosure are described in detail below, and examples of the embodiments are shown in accompanying drawings. The following embodiments described with reference to the accompanying drawings are exemplary and are intended to explain the present disclosure and cannot be understood as limitations on the present disclosure.

A brake device 1 for a winch and a winch according to embodiments of the present disclosure are described below with reference to FIGS. 1 to 4.

As shown in FIGS. 1 to 4, the winch includes a rope drum 2, and the brake device 1 includes a brake sleeve 11, an elastic ring 12, a torsion spring 13, and a braking assembly 14. The torsion spring 13 is fitted over the braking assembly 14, and the brake sleeve 11 is fitted over the torsion spring 13. The braking assembly 14 is configured to drive the torsion spring 13 to move between an extended position and a retracted position, so as to lock and release the brake sleeve 11. The elastic ring 12 is fitted over the brake sleeve 11 (specifically, over an outer peripheral wall of the brake sleeve 11) and is configured to abut with an inner wall (specifically, an inner peripheral wall) of the rope drum 2.

It can be understood that the brake sleeve 11 is arranged in the rope drum 2, and the elastic ring 12 is arranged between the outer peripheral wall of the brake sleeve 11 and the inner peripheral wall of the rope drum 2. When the winch pulls a rope, the rope drum 2 may drive the brake sleeve 11 to rotate in a same direction, and the torsion spring 13 is in the retracted position at this time. An inner wall of the brake sleeve 11 and the torsion spring 13 define a gap therebetween, so that no friction exists between the brake sleeve 11 and the torsion spring 13. Thus, the periodic noise generated between the brake sleeve 11 and the torsion spring 13 during the operation of the winch can be suppressed.

In the brake device 1 for the winch according to the embodiments of the present disclosure, the elastic ring 12 is fitted over the brake sleeve 11 and an outer periphery of the elastic ring 12 abuts with the rope drum 2, so that a gap between the brake sleeve 11 and the rope drum 2 can be adjusted by the elastic ring 12, and hence the brake sleeve 11 and the rope drum 2 can float relative to each other within a certain range, thus reducing the noise generated by the friction between the brake sleeve 11 and the torsion spring 13, and reducing the equipment vibration caused by manufacturing errors. In addition, the brake device 1 for the winch according to the embodiments of the present disclosure can reduce the operating load, reduce the operating current, reduce the energy consumption, and have a good use effect.

Figure 2:
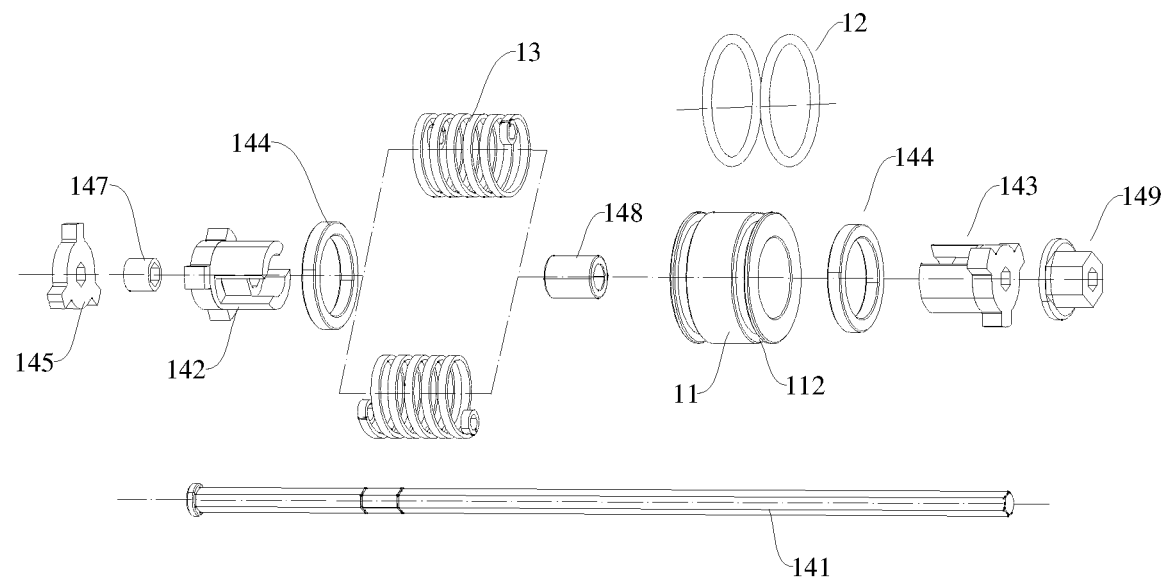
FIG. 2 is an exploded view of a brake device for a winch according to an embodiment of the present disclosure.
Figure 3:
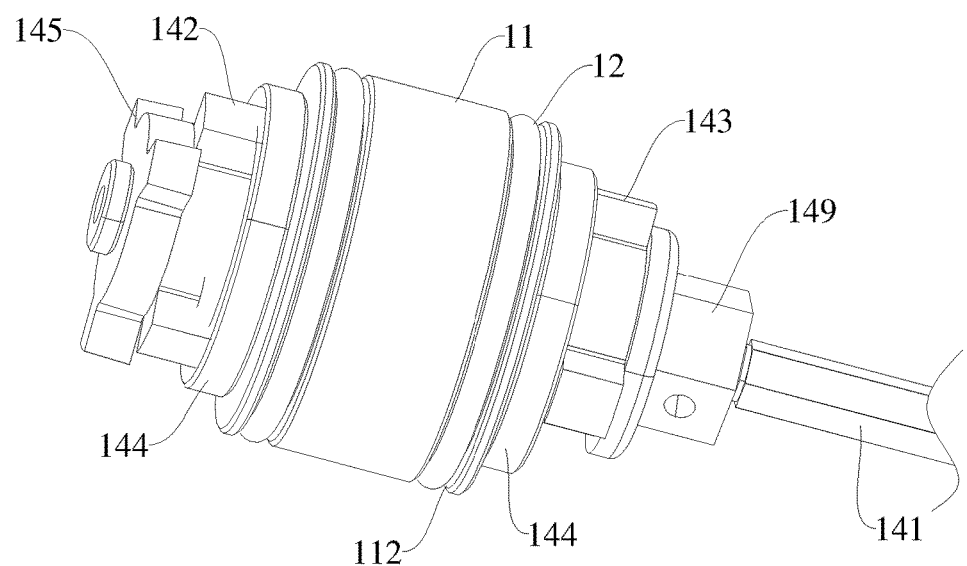
FIG. 3 is a partial schematic view of a brake device for a winch according to an embodiment of the present disclosure.

It can be understood that, as shown in FIGS. 1 and 2, one or more elastic rings 12 may be provided. For example, in the embodiments of the present disclosure, two elastic rings 12 are provided, and the two elastic rings 12 are spaced apart along an axial direction of the brake sleeve 11. In the brake device 1 for the winch according to the embodiments of the present disclosure, the two elastic rings 12 are arranged, so that the brake sleeve 11 and the rope drum 2 can rotate smoothly, which is conducive to further reducing the noise. For example, the elastic ring 12 may be an O-shaped rubber ring, so that the production cost can be reduced, the structure is simple, and the processing and assembling are convenient.

In some embodiments, as shown in FIGS. 1 and 2, the brake sleeve 11 has a first mounting portion 111 where the brake sleeve 11 is configured to be fixed with the rope drum 2, and the two elastic rings 12 are arranged on both sides of the first mounting portion 111, respectively. For example, the rope drum 2 has a second mounting portion 21, and a threaded member may pass through the second mounting portion 21 and be screwed into the first mounting portion 111, so as to fix the brake sleeve 11 with the rope drum 2 relative to each other. In this case, the second mounting portion 21 may include a through hole, and the first mounting portion 111 may include a threaded hole. Further, the through hole of the second mounting portion 21 may have threads or not, and the threaded hole of the first mounting portion 111 may be a blind hole or a through hole. The two elastic rings 12 are arranged on both sides of the first mounting portion 111, respectively, so that the brake sleeve 11 and the rope drum 2 can be buffered by the elastic rings 12 on both sides when they float relative to each other, and hence the brake sleeve 11 and the rope drum 2 can rotate smoothly, which is conducive to further hindering the generation of noise.

In some embodiments, as shown in FIGS. 1 and 2, the outer peripheral wall of the brake sleeve 11 has an annular groove 112, and the elastic ring 12 is fitted in the annular groove 112. An outer diameter of the elastic ring 12 is greater than a depth of the annular groove 112. It can be understood that the elastic ring 12 may be clamped in the annular groove 112, so as to prevent the elastic ring 12 from moving in the axial direction of the brake sleeve 11, thus improving the reliability of the connection of the elastic ring 12. Moreover, the outer diameter of the elastic ring 12 is greater than the depth of the annular groove 112, so that a certain gap for floating may be provided between the outer peripheral wall of the brake sleeve 11 and the inner wall of the rope drum 2, thus reducing the equipment vibration caused by manufacturing errors.

In some embodiments, as shown in FIG. 2, two torsion springs 13 are provided, and the two torsion springs 13 are coaxially fitted over the braking assembly 14. In the brake device 1 for the winch according to the embodiments of the present disclosure, the two torsion springs 13 are arranged, so that the brake device 1 has a great brake effect and a high reliability.

Figure 4:
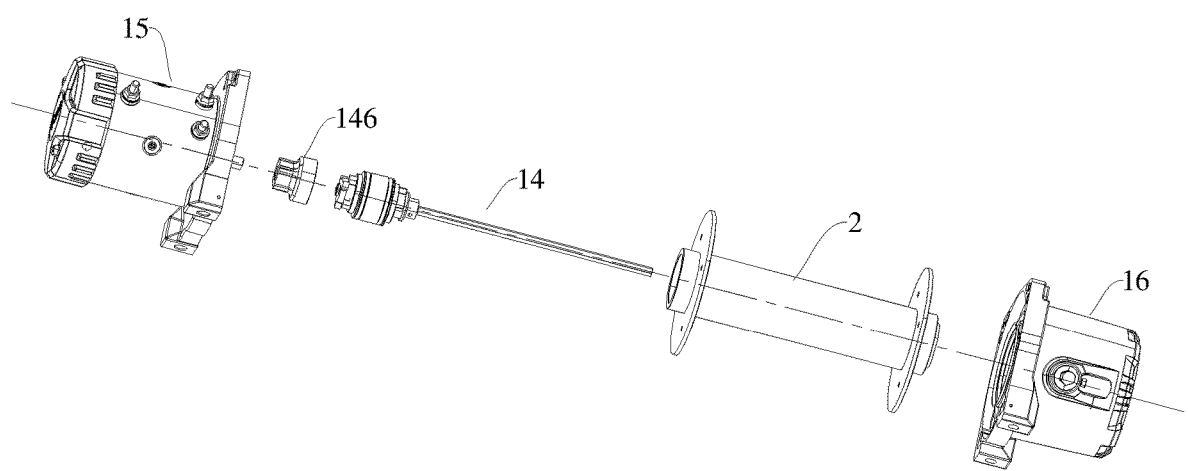
FIG. 4 is an exploded view of a winch according to an embodiment of the present disclosure.

In some embodiments, as shown in FIGS. 1, 2 and 4, the braking assembly 14 includes a drive motor 15, a connecting rod 141, a front pawl 142 and a rear pawl 143. The drive motor 15 is connected to the connecting rod 141. The front pawl 142 and the rear pawl 143 are coaxially arranged on (specifically, fitted over) the connecting rod 141, and the torsion spring 13 is arranged around (i.e. fitted over) the front pawl 142 and the rear pawl 143. The drive motor 15 is configured to drive the front pawl 142 and the rear pawl 143 to rotate through the connecting rod 141, so that the torsion spring 13 moves between the extended position and the retracted position. It can be understood that the front pawl 142 and the rear pawl 143 are coaxially arranged relative to each other, a front end of the torsion spring 13 is fitted over the front pawl 142, and a rear end of the torsion spring 13 is fitted over the rear pawl 143. In some embodiments, the front pawl 142 and the rear pawl 143 may be spaced apart from each along the axial direction of the brake sleeve 11.

It can be understood that, as shown in FIGS. 1 and 2, when the winch implements a traction operation, the drive motor 15 drives the front pawl 142 to rotate counterclockwise, the front pawl 142 drives the rear pawl 143 to rotate, and then the front pawl 142 and the rear pawl 143 drive the torsion spring 13 to rotate counterclockwise (a portion of the torsion spring 13 close to the rear pawl 143 changes slowly, for example, in speed, while a portion of the torsion spring 13 close to the front pawl 142 changes quickly, for example, in speed). At this time, a force applied to the torsion spring 13 for counterclockwise rotation overcomes an initial friction between the torsion spring 13 and the brake sleeve 11, and the torsion spring 13 is still retracted, so that it will not lead to a brake effect together with the brake sleeve 11, thus achieving the traction operation. When the drive motor 15 suddenly stops rotating during the traction operation, the torsion spring 13 is subjected to a reverse force as the rear pawl 143 is under the action of the gravity of the driven object. At this time, the reverse force overcomes the initial friction between the torsion spring 13 and the brake sleeve 11 (the portion of the torsion spring 13 close to the rear pawl 143 changes quickly, for example, in speed, while the portion of the torsion spring 13 close to the front pawl 142 changes slowly for example, in speed, under the influence of the initial friction), and the torsion spring 13 is extended, so that the brake effect is realized.

Specifically, as shown in FIGS. 1 and 2, the braking assembly 14 further includes two brake rings 144. The two brake rings 144 are spaced apart and fitted over the torsion spring 13. One brake ring 144 is arranged between the front pawl 142 and the brake sleeve 11, and the other brake ring 144 is arranged between the rear pawl 143 and the brake sleeve 11. In other words, the brake sleeve 11 is arranged between the two brake rings 144. In the brake device 1 for the winch according to the embodiments of the present disclosure, the brake rings 144 are arranged, so that a position of the brake sleeve 11 may be limited, so as to prevent the brake sleeve 11 from moving axially. Thus, the brake device 1 can reach a good use effect.

In some embodiments, as shown in FIGS. 1 and 2, the braking assembly 14 further includes a shift fork 145 and a coupling 146. The shift fork 145 is fitted over the connecting rod 141. One end of the coupling 146 has a profiled groove, the shift fork 145 is mounted in the profiled groove, and the other end of the coupling 146 is connected to the drive motor 15. The drive motor 15 is configured to drive the coupling 146 to rotate, so that the shift fork 145 drives the connecting rod 141 to rotate. For example, the shift fork 145 is a three-claw shift fork 145. The profiled groove matched with the shift fork 145 is arranged in the coupling 146. By mounting the shift fork 145 in the profiled groove, the coupling 146 may drive the shift fork 145 to rotate, and then drive the connecting rod 141 to rotate, so that the brake device 1 has a good transmission effect.

Further, as shown in FIGS. 1 and 2, the braking assembly 14 further includes a first sleeve 147, and the first sleeve 147 is fitted over the connecting rod 141 and fixed with the connecting rod 141. An inner wall of the first sleeve 147 is fitted with the connecting rod 141, and an outer wall of the first sleeve 147 is fitted with the front pawl 142, so that the connection effect between the front pawl 142 and the connecting rod 141 can be good.

In some embodiments, as shown in FIGS. 1 and 2, the braking assembly 14 further includes a second sleeve 148, and the second sleeve 148 is fitted over the connecting rod 141 and fixed with the connecting rod 141. An inner wall of the second sleeve 148 is fitted with the connecting rod 141, one portion of an outer wall of the second sleeve 148 is fitted with an inner wall of the front pawl 142, and the other portion of the outer wall of the second sleeve 148 is fitted with an inner wall of the rear pawl 143, so that the connection effect between the front pawl 142 and the connecting rod 141 as well as the connection effect between the rear pawl 143 and the connecting rod 141 can be great.

In some embodiments, as shown in FIGS. 1 and 2, the braking assembly 14 further includes a limiting block 149. The limiting block 149 is arranged on an end of the rear pawl 143 facing away from the front pawl 142 and is connected to the connecting rod 141. The limiting block 149 is fixed with the connecting rod 141 by a threaded member, so that the structural design of the braking assembly 14 can be reasonable and the reliability after connection is high.

Further, as shown in FIG. 4, the brake device 1 further includes a speed reducer 16, and an end of the connecting rod 141 facing away from the drive motor 15 is connected to the speed reducer 16, so that the speed control effect of the brake device 1 can be great.

As shown in FIG. 4, the winch according to another embodiment of the present disclosure includes the rope drum 2 and the brake device 1. The rope drum 2 is configured to wind a traction rope on its outer periphery. The brake device 1 is the brake device 1 for the winch according to the embodiments of the present disclosure. The brake sleeve 11 is arranged in the rope drum 2, and the elastic ring 12 abuts with the inner wall of the rope drum 2.

For example, as shown in FIG. 4, the drive motor 15 is arranged on one end of the rope drum 2, the speed reducer 16 is arranged on the other end of the rope drum 2, and the connecting rod 141 is located in the rope drum 2 and connected to the drive motor 15 and the speed reducer 16, respectively.

In the winch according to the embodiments of the present disclosure, the elastic ring 12 is fitted over the brake sleeve 11 and the outer periphery of the elastic ring 12 abuts with the rope drum 2, so that the gap between the brake sleeve 11 and the rope drum 2 can be adjusted by the elastic ring 12, and hence the brake sleeve 11 and the rope drum 2 can float relative to each other within a certain range, thus reducing the noise generated by the friction between the brake sleeve 11 and the torsion spring 13, and reducing the equipment vibration caused by manufacturing errors. In addition, the winch according to the embodiments of the present disclosure can reduce the operating load, reduce the operating current, reduce the energy consumption, and have a good use effect.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "peripheral" should be construed to refer to the orientation and position as then described or as shown in the drawings under discussion. These relative terms are only for convenience of description and do not indicate or imply that the device or element referred to must have a particular orientation, or be constructed and operated in a particular orientation. Thus, these terms shall not be construed as limitation on the present disclosure.

In addition, terms "first" and "second" are only used for descriptive purposes and cannot be understood as indicating or implying relative importance or implicitly indicating the number of indicated technical features. Thus, the features defined by "first" and "second" may include at least one of the features explicitly or implicitly. In the description of the present disclosure, "a plurality of" means at least two such as two or three, unless otherwise expressly and specifically defined.

In the present disclosure, unless otherwise expressly defined, terms such as "mounting," "interconnection," "connection," "fixing" shall be understood broadly, and may be, for example, fixed connections, detachable connections, or integral connections; may also be mechanical or electrical connections or intercommunication; may also be direct connections or indirect connections via intervening media; may also be inner communications or interactions of two elements. For those skilled in the art, the specific meaning of the above terms in the present disclosure can be understood according to the specific situations.

In the present disclosure, unless otherwise expressly defined and specified, a structure in which a first feature is "on" or "below" a second feature may include an embodiment in which the first feature is in direct contact with the second feature, or may further include an embodiment in which the first feature and the second feature are in indirect contact through intermediate media. Furthermore, a first feature "on," "above," or "on top of" a second feature may include an embodiment in which the first feature is right or obliquely "on," "above," or "on top of" the second feature, or just means that the first feature is at a height higher than that of the second feature, while a first feature "below," "under," or "on bottom of" a second feature may include an embodiment in which the first feature is right or obliquely "below," "under," or "on bottom of" the second feature, or just means that the first feature is at a height lower than that of the second feature.

In the description of the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are exemplary and shall not be understood as limitation to the present disclosure, and changes, modifications, alternatives and variations can be made in the above embodiments within the scope of the present disclosure by those skilled in the art.

The invention claimed is:

1. A brake device for a winch, the winch comprising a rope drum, the brake device comprising a brake sleeve, an elastic ring, a torsion spring and a braking assembly, the torsion spring being fitted over the braking assembly, the brake sleeve being fitted over the torsion spring, the braking assembly being configured to drive the torsion spring to move between an extended position and a retracted position, so as to lock and release the brake sleeve, the elastic ring being fitted over the brake sleeve and configured to abut with an inner wall of the rope drum, wherein:

the braking assembly comprises a drive motor, a connecting rod, a front pawl and a rear pawl, the drive motor is connected to the connecting rod, the front pawl and the rear pawl are coaxially arranged on the connecting rod, the torsion spring is arranged around the front pawl and the rear pawl, the drive motor is configured to drive the front pawl and the rear pawl to rotate through the connecting rod, so that the torsion spring moves between the extended position and the retracted position; and the braking assembly further comprises two brake rings, the two brake rings are spaced apart and fitted over the torsion spring, one of the two brake rings is arranged between the front pawl and the brake sleeve, and the other one of the two brake rings is arranged between the rear pawl and the brake sleeve.

2. The brake device for the winch according to claim 1, wherein two elastic rings are provided, and the two elastic rings are spaced apart along an axial direction of the brake sleeve.

3. The brake device for the winch according to claim 2, wherein the brake sleeve has a first mounting portion where the brake sleeve is configured to be fixed with the rope drum, and the two elastic rings are arranged on both sides of the first mounting portion, respectively.

4. The brake device for the winch according to claim 1, wherein the brake sleeve has an annular groove in an outer peripheral of the brake sleeve, the elastic ring is fitted in the annular groove, and an outer diameter of the elastic ring is greater than a depth of the annular groove.

5. The brake device for the winch according to claim 1, wherein two torsion springs are provided, and the two torsion springs are coaxially fitted over the braking assembly.

6. The brake device for the winch according to claim 1, wherein the braking assembly further comprises a shift fork and a coupling, the shift fork is fitted over the connecting rod, one end of the coupling has a profiled groove, the shift fork is mounted in the profiled groove, the other end of the coupling is connected to the drive motor, and the drive motor is configured to drive the coupling to rotate, so that the shift fork drives the connecting rod to rotate.

7. The brake device for the winch according to claim 1, further comprising a speed reducer connected to an end of the connecting rod facing away from the drive motor.

8. A winch, comprising:
a rope drum configured to wind a traction rope on an outer periphery of the rope drum; and
a brake device arranged in the rope drum, the brake device comprising a brake sleeve, an elastic ring, a torsion spring and a braking assembly, the torsion spring being fitted over the braking assembly, the brake sleeve being fitted over the torsion spring, the braking assembly being configured to drive the torsion spring to move between an extended position and a retracted position, so as to lock and release the brake sleeve, the elastic ring being fitted over the brake sleeve and abutting with an inner wall of the rope drum,
wherein:
the braking assembly comprises a drive motor, a connecting rod, a front pawl and a rear pawl, the drive motor is connected to the connecting rod, the front pawl and the rear pawl are coaxially arranged on the connecting rod, the torsion spring is arranged around the front pawl and the rear pawl, the drive motor is configured to drive the front pawl and the rear pawl to rotate through the connecting rod, so that the torsion spring moves between the extended position and the retracted position; and
the braking assembly further comprises two brake rings, the two brake rings are spaced apart and fitted over the torsion spring, one of the two brake rings is arranged between the front pawl and the brake sleeve, and the other one of the two brake rings is arranged between the rear pawl and the brake sleeve.

9. The winch according to claim 8, wherein two elastic rings are provided, and the two elastic rings are spaced apart along an axial direction of the brake sleeve.

10. The winch according to claim 9, wherein the brake sleeve has a first mounting portion where the brake sleeve is configured to be fixed with the rope drum, and the two elastic rings are arranged on both sides of the first mounting portion, respectively.

11. The winch according to claim 8, wherein the brake sleeve has an annular groove in an outer peripheral of the brake sleeve, the elastic ring is fitted in the annular groove, and an outer diameter of the elastic ring is greater than a depth of the annular groove.

12. The winch according to claim 8, wherein two torsion springs are provided, and the two torsion springs are coaxially fitted over the braking assembly.

13. The winch according to claim 8, wherein the braking assembly further comprises a shift fork and a coupling, the shift fork is fitted over the connecting rod, one end of the coupling has a profiled groove, the shift fork is mounted in the profiled groove, the other end of the coupling is connected to the drive motor, and the drive motor is configured to drive the coupling to rotate, so that the shift fork drives the connecting rod to rotate.

14. The winch according to claim 8, further comprising a speed reducer connected to an end of the connecting rod facing away from the drive motor.

15. A brake device for a winch, the winch comprising a rope drum, the brake device comprising a brake sleeve, an elastic ring, a torsion spring and a braking assembly, the torsion spring being fitted over the braking assembly, the brake sleeve being fitted over the torsion spring, the braking assembly being configured to drive the torsion spring to move between an extended position and a retracted position, so as to lock and release the brake sleeve, the elastic ring being fitted over the brake sleeve and configured to abut with an inner wall of the rope drum, wherein:
the braking assembly comprises a drive motor, a connecting rod, a front pawl and a rear pawl, the drive motor is connected to the connecting rod, the front pawl and the rear pawl are coaxially arranged on the connecting rod, the torsion spring is arranged around the front pawl and the rear pawl, the drive motor is configured to drive the front pawl and the rear pawl to rotate through the connecting rod, so that the torsion spring moves between the extended position and the retracted position; and
the brake device further comprising a speed reducer connected to an end of the connecting rod facing away from the drive motor.

* * * * *